Figure 1:
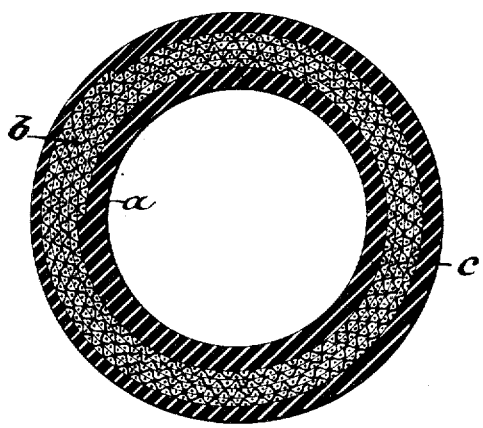

R. J. EVANS.
HOSE.
APPLICATION FILED APR. 13, 1909.

1,158,995.

Patented Nov. 2, 1915.

Witnesses:
William Fries
J. M. Copenhaver

Inventor:
Richard J. Evans,
by W. B. Corwin,
Atty.

UNITED STATES PATENT OFFICE.

RICHARD J. EVANS, OF FRANKLIN, PENNSYLVANIA.

HOSE.

1,158,995.  Specification of Letters Patent.  Patented Nov. 2, 1915.

Application filed April 13, 1909. Serial No. 489,612.

*To all whom it may concern:*

Be it known that I, RICHARD J. EVANS, a citizen of the United States of America, residing at Franklin, in the county of Venango and State of Pennsylvania, have invented a new and useful Improvement in Hose, of which the following is a specification.

Heretofore, hose generally, and particularly air-brake hose, steam-hose, and fire-hose, has been composed of an interior and an exterior layer of rubber, with usually a fabric structure of sea-island cotton duck or the layers of rubber, the duck being cemented to the two layers of rubber and the several plies or thicknesses or layers of duck being cemented to each other by a rubber cement, the entire structure being subsequently vulcanized after being so formed. Sometimes it has been customary to cut the cotton duck used for this purpose on the bias, and sometimes straight, and a hose comprising in its structure cotton duck cut both straight and on the bias has been made. All these forms of hose, however, in practical and hard use have had inherent defects, due to the nature of the fabric used. The cotton or other vegetable duck is very susceptible to rot both by water and steam and acids or other material passing through the hose, and is not very strong at the lap joints when wound spirally in layers one upon another around the inner rubber tube. The cotton duck also deteriorates in the vulcanizing operation, due principally to the action of the rubber and sulfur used in such operation.

The object of my present invention is to provide a hose for air-brake, steam, fire, and other purposes, where strength, durability, and non-susceptibility to deterioration by chemical action or the effect of water, or moisture, or pressure are desired. To this end, I form my improved hose of an inner layer or tube of india rubber constructed or formed in any desired or preferred manner, around which is wrapped in a plurality of layers or plies a structure or covering of woven asbestos duck or fabric, each thread or strand of such fabric having, preferably, a fine wire of brass or copper or other suitable metal running through its center, the said asbestos ducking or fabric having applied to its surface before winding a coating of india rubber in the ordinary manner known in the art as friction-rolled, or it may be so applied with a brush, the layers or plies of asbestos ducking or fabric being wound around the inner tube of rubber a number of times corresponding to the thickness and strength desired in the finished hose. The asbestos ducking or fabric thus applied is then covered in the ordinary manner with an outer covering or layer of india rubber of any preferred thickness, and the entire structure thus formed is then vulcanized in the usual way. Before application to the inner tube of rubber, the asbestos fabric or ducking is preferably cut on the bias into strips and said strips stretched in any suitable apparatus, so that when the strips are wrapped around the inner tube of rubber they will not be susceptible to further stretching after the hose has been vulcanized and when the same is in use, or if so only to an inappreciable degree.

While my invention will readily be understood from the foregoing description by those skilled in the art, I have thought it best to illustrate it, and therefore refer to the accompanying drawing, in which—

Figure 2:
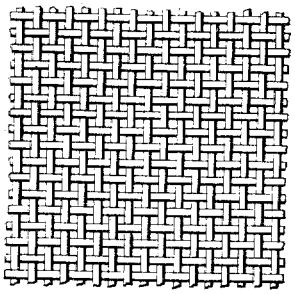
Figure 3:
Figure 4:
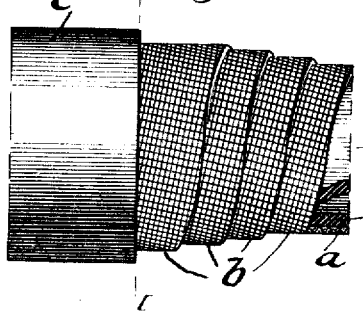

Figure 1 is a section of a hose constructed in accordance with my invention, on the line I—I of Fig. 4. Fig. 2 is a view showing the asbestos fabric. Fig. 3 is a view of the fabric showing the central metallic strengthening members or wires. Fig. 4 is a perspective view of the hose showing the various layers forming the same.

Like letters of reference indicate like parts in each of the several figures.

In the drawing, *a* indicates the inner layer or tube of india rubber; *b* the several plies or layers of asbestos fabric wrapped around the said layer of rubber and wound upon each other; and *c* the outer protecting layer or envelop of india rubber surrounding the outermost layer of asbestos fabric.

My improved hose thus constructed is much stronger and much more durable and longer lived than the ordinary hose heretofore in use, and practically is free from deterioration by rotting or chemical action, as the asbestos fabric or ducking applied in the manner I have described is much stronger than ordinary cotton or other fabric heretofore used for such purpose and adheres to the rubber better, making stronger lap joints when the fabric or ducking is wound in layers in the manner described. The fabric so applied will not stretch after incorporation with the structure of the hose, and substantially is indestructible by any of the influences to which such hose is subjected.

I claim:—

As an article of manufacture, a hose containing an inner and an outer layer of rubber, and interposed between said layers of rubber a fabric of woven asbestos in two or more layers cut on the bias and wound and superposed on each other spirally, the said layers of fabric being stretched before being incorporated in the hose structure.

In witness whereof I have hereunto set my hand.

RICHARD J. EVANS.

Witnesses:
F. M. SIMPKINS,
WM. S. TAFT.

Correction in Letters Patent No. 1,158,995.

It is hereby certified that in Letters Patent No. 1,158,995, granted November 2, 1915, upon the application of Richard J. Evans, of Franklin, Pennsylvania, for an improvement in "Hose," an error appears in the printed specification requiring correction as follows: Page 1, line 12, after the word "or" insert the words *other vegetable fabric interposed between;* and that the said Letters Patent should be read with this correction therein that the same may conform to the record of the case in the Patent Office.

Signed and sealed this 23rd day of November, A. D., 1915.

[SEAL.]

J. T. NEWTON,
*Acting Commissioner of Patents.*

Cl. 137—90.